United States Patent [19]

Strathman et al.

[11] Patent Number: 5,694,191
[45] Date of Patent: Dec. 2, 1997

[54] LIQUID CRYSTAL DISPLAYS WITH UNIFORMED HEAT PRODUCING APPARATUS

[76] Inventors: Lyle R. Strathman, 294 Thunderbird Rd. SE., Cedar Rapids, Iowa 52403; Todd Twachtmann, 3350 26th Ave., Marion, Iowa 52302

[21] Appl. No.: 690,032

[22] Filed: Jul. 31, 1996

Related U.S. Application Data

[63] Continuation of Ser. No. 259,022, Jun. 13, 1994, abandoned.
[51] Int. Cl.[6] .............................. G02F 1/1333; G02F 1/133
[52] U.S. Cl. .................................................. 349/161; 349/72
[58] Field of Search ............................ 359/86; 349/161, 349/72

[56] References Cited

U.S. PATENT DOCUMENTS 4,987,289  1/1991  Bishop et al. .......................... 359/86

FOREIGN PATENT DOCUMENTS 57-192927  11/1982  Japan .......................... 359/86
5-107526   4/1993   Japan .......................... 359/86

*Primary Examiner*—William L. Sikes
*Assistant Examiner*—Charles Miller
*Attorney, Agent, or Firm*—Gregory G. Williams; M. Lee Murrah

[57] ABSTRACT

A liquid crystal display having an non-uniform heat producing element disposed therein which produces more heat around the periphery of the display by providing a transparent heating element on the display surface and a plurality of shorting bars which provide for a lower impedance path around the display periphery, and therefore a higher current and higher heat generation in the resistive film disposed immediately about the shorting bars.

5 Claims, 4 Drawing Sheets

LIQUID CRYSTAL DISPLAYS WITH UNIFORMED HEAT PRODUCING APPARATUS

This application is a Continuation of application Ser. No. 08/259,022 filed Jun. 13, 1994, now abandoned.

BACKGROUND OF THE INVENTION

The present invention generally relates to liquid crystal displays (LCDs), and more particularly to LCDs with heating elements therein for heating the display surface.

In todays aviation industry, aircraft are called upon to operate in extremely cool conditions. For example, the temperature in the cockpit of a small business jet might reach below 0 degrees F. on an overnight stop during a northern Minnesota winter, where the ambient temperature might drop below −40 degrees F. The liquid crystal (LC) material in an LCD behaves remarkably different at 0 degrees F. than at room temperature or higher. In the past, uniform heating films have been applied to the LC material. However, typically LCDs are physically contained inside a rigid metal box by being clamped around their periphery. The metal box can act as a heat sink or heat conduction and storage area. If the faceplate of an LCD is heated uniformly, the periphery of the LCD may lose heat through conduction to the metal box. This typically results in a non-uniform temperature across the LC surface. This non-uniform temperature can cause undesirable degradation of the uniformity of performance across the display. Typically, colder areas are much slower to respond than warmer areas. This can result in the center (warm area) of a display responding quickly while the periphery (cold area) is much slower. This can result in a much degraded image, especially for rapidly changing displays.

Consequently, there exists a need for improvement in LCDs having an improved temperature uniformity across the display surface.

SUMMARY OF THE INVENTION

It is an object of the present invention to provide a display with enhanced image quality when used in cold environments.

It is a feature of the present invention to include a non-uniform heat producing film disposed on a liquid crystal display surface.

It is an advantage of the present invention to provide a liquid crystal display with a more uniform temperature across the display surface.

It is an object of the present invention to provide an easily manufactured liquid crystal display heating element.

It is another feature of the present invention to include a resistive heating film with non-uniform current paths therethrough.

It is another advantage of the present invention to allow for compensation of the heat lost in thermal conduction through the physical connection of the LCD with its container by providing a non-uniform heat producing film disposed on or about the liquid crystal material.

The present invention provides an improved LCD with increased uniformity of temperature across the display surface, which is designed to satisfied the aforementioned needs, include the above described objects, contain the earlier articulated features, and provide the previously stated advantages. The invention is carried out in a "cold periphery-less" system in the sense that the colder periphery of the display surface caused by heat conduction into the box has been greatly reduced. Instead, an improved LCD with a non-uniform heat generating film is utilized to compensate and provide extra heat to the periphery of the display surface.

Accordingly, the present invention includes a liquid crystal display having a liquid crystal material therein with physical connections around its periphery and a heating element disposed on the liquid crystal material which produces more heat around the periphery.

BRIEF DESCRIPTION OF THE DRAWINGS

The invention may be more fully understood by reading the following description of a preferred embodiment of the invention in conjunction with the appended drawings wherein.

DETAILED DESCRIPTION

Figure 1:
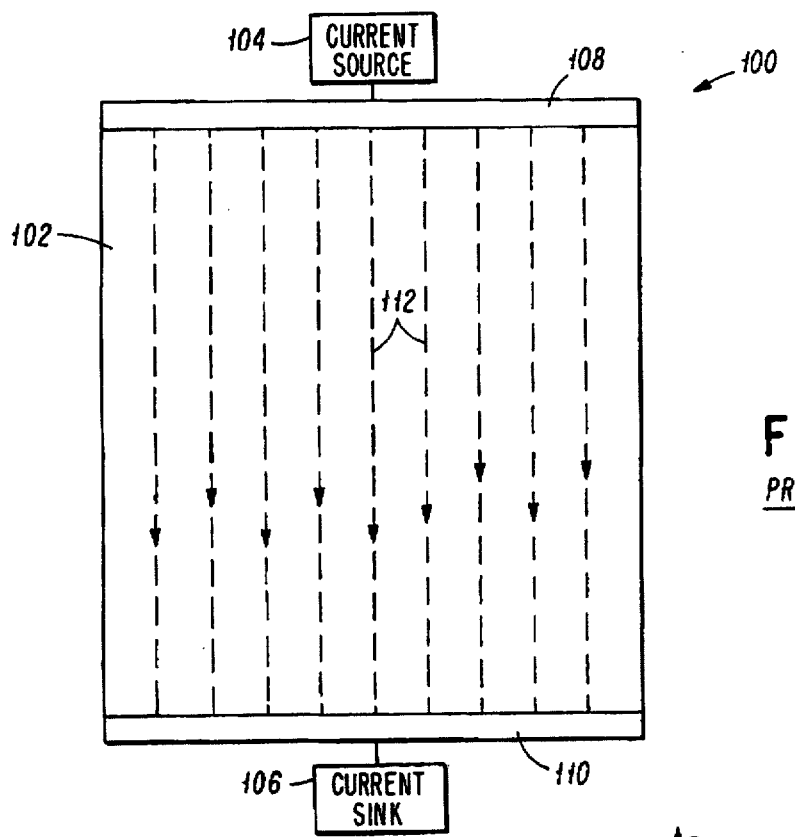
FIG. 1 is a plan view of a heating system, of the prior art, which utilizes a uniform resistive film and a pair of electrodes which produce a uniform current flow (dotted lines) across the film.

Now referring to the drawings, wherein like numerals refer to like text and matter throughout, and more particularly referring to FIG. 1, there is shown an LCD heater, of the prior art, generally designated 100, having a resistive transparent film 102 such as indium tin oxide (ITO) disposed in a relatively uniform fashion, a current source 104 and a current sink 106 coupled to source electrode 108 and sink electrode 110, respectively. Shown with dotted lines between source electrode 108 and sink electrode 110 are a plurality of current paths 112 which are depicted as being generally uniform across film 102.

Figure 2:
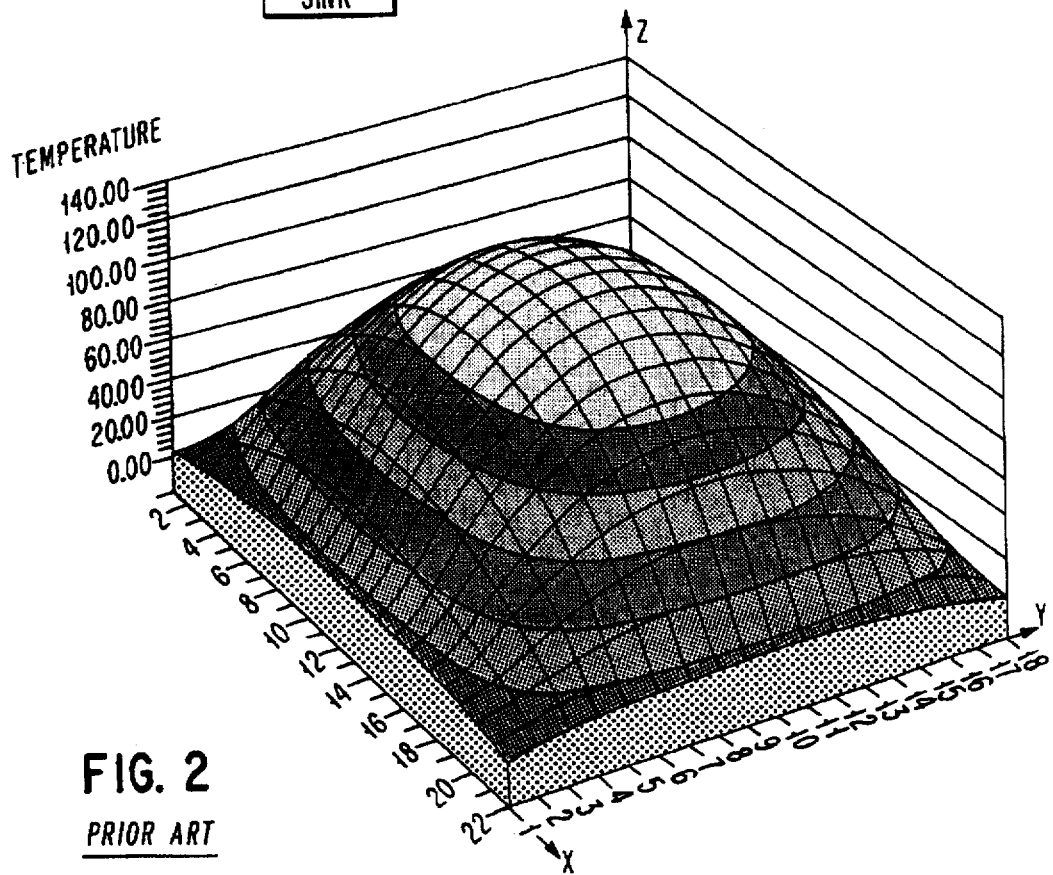
FIG. 2 is a three dimensional plot of the temperature (vertical axis) across a prior art display surface which shows a high temperature differential between the center of the panel and its periphery.

Now referring to FIG. 2, there is a three dimensional plot of the temperature, in the z axis, versus the display surface in the x and y axes. The center of the display surface clearly is shown to have a higher temperature in relation to the periphery of the display surface. This represents the effect of the thermal conduction around the periphery of the liquid crystal display, of the prior art.

Figure 3:
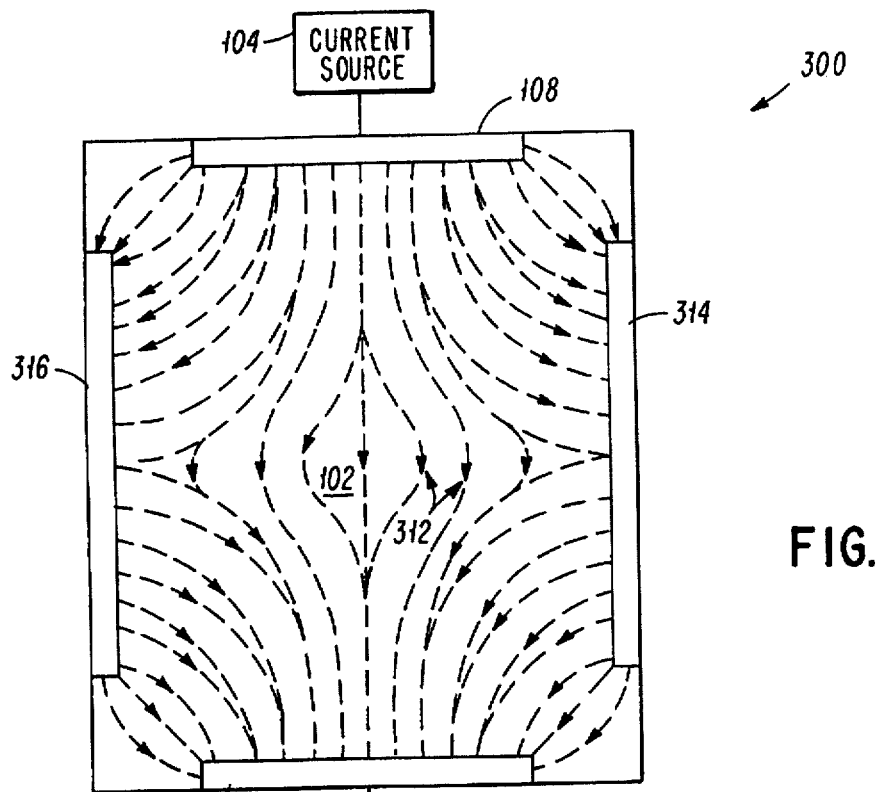
FIG. 3 is a plan view of the heater element, of the present invention, which shows the inclusion of two shorting bars therein which generate a non-uniform current flow (dotted lines) through the film.

Now referring to FIG. 3, there is shown a plan view of the LCD heater, of the present invention, generally designated 300, having a resistive film 102 which is preferably disposed on the display surface of the LCD. The heater 300 having a current source 104, current sink 106, source electrode 108, and sink electrode 110. Also shown is a first shorting bar 314 and a second shorting bar 316 disposed opposite each other and generally between source electrode 108 and sink electrode 110. Shorting bars 314 and 316 are preferably low impedance conductors similar to electrodes 108 and 110. However, the material of and impedance of bars 314 and 316 may be varied as a matter of designers choice which would provide for variable current paths through the film 102. The lower the impedance chosen for bars 314 and 316 will provide for a higher heat generation around the periphery as opposed to the center of the film 102. Also shown are current paths 312 which are non-uniformly disposed across the film 102. Shorting bars 314 and 316 provide a lower impedance path between source electrode 108 and sink electrode 110 and consequently a higher portion of the current flow will be contained in bars 314 and 316 and the areas of the film 102 immediately about the bars 314 and 316.

Figure 4:
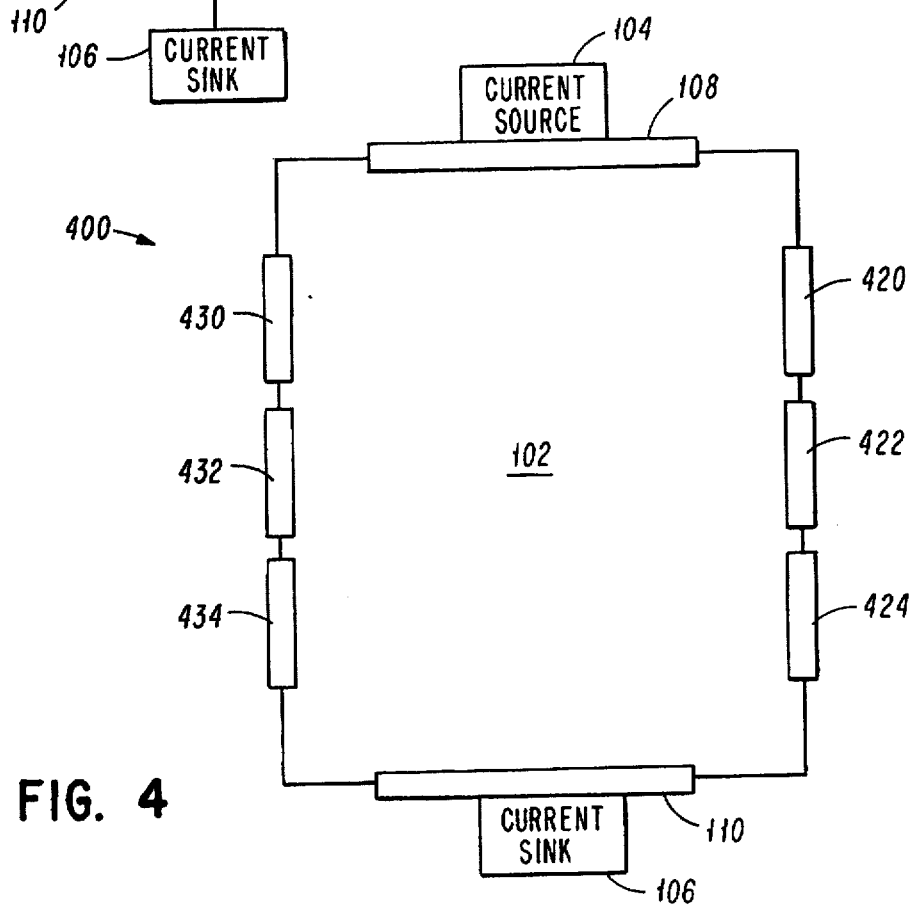
FIG. 4 is an alternative embodiment, of the present invention, which shows a group of smaller shorting bars disposed along the edges of the film for producing a different current flow pattern through the heating film.

Now referring to FIG. 4, there is shown an alternative embodiment of the present invention, generally designated 400, having a resistive film 102, current source 104, current sink 106 and source electrodes 108 and 110. Shorting bars 314 and 316 (FIG. 3) have been replaced with shorting bars 420, 422, 424, 430, 432, and 434. The size, shape, material, impedance and placement of shorting bars 420, 422, 424, 430, 432, and 434 are a matter of designers choice which can be varied to accommodate the needs of a particular situation which may be variable depending upon the thermal conductive nature of the material surrounding the periphery of the film 102. Not shown in FIG. 4 are current paths which are essentially identical to those shown in FIG. 7.

Figure 5:
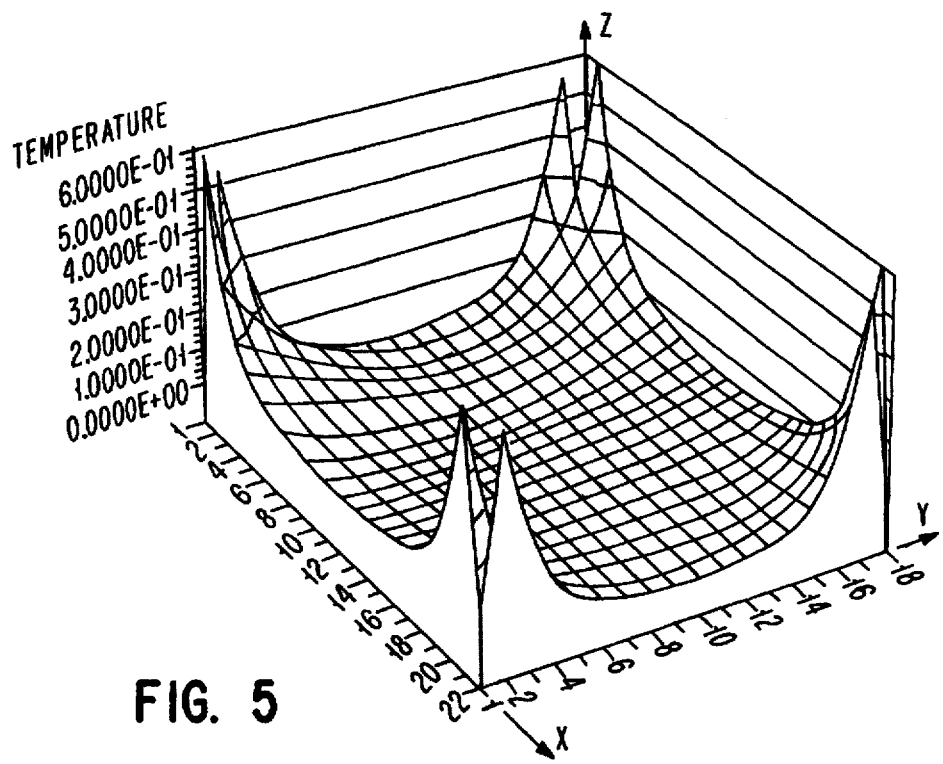
FIG. 5 is a three dimensional plot of the heat generated by the heating film, of the present invention, showing the increased heat output around the periphery.

Now referring to FIG. 5, there is shown a three dimensional plot of the temperature (z axis) versus display area in the x and y axes for a heater, of the present invention. The heat generated around the periphery is clearly shown to be higher than the heat generated in the center of the display area. This is effectively a heat compensator for the thermal conduction occurring around the periphery of the display surface.

Figure 6:
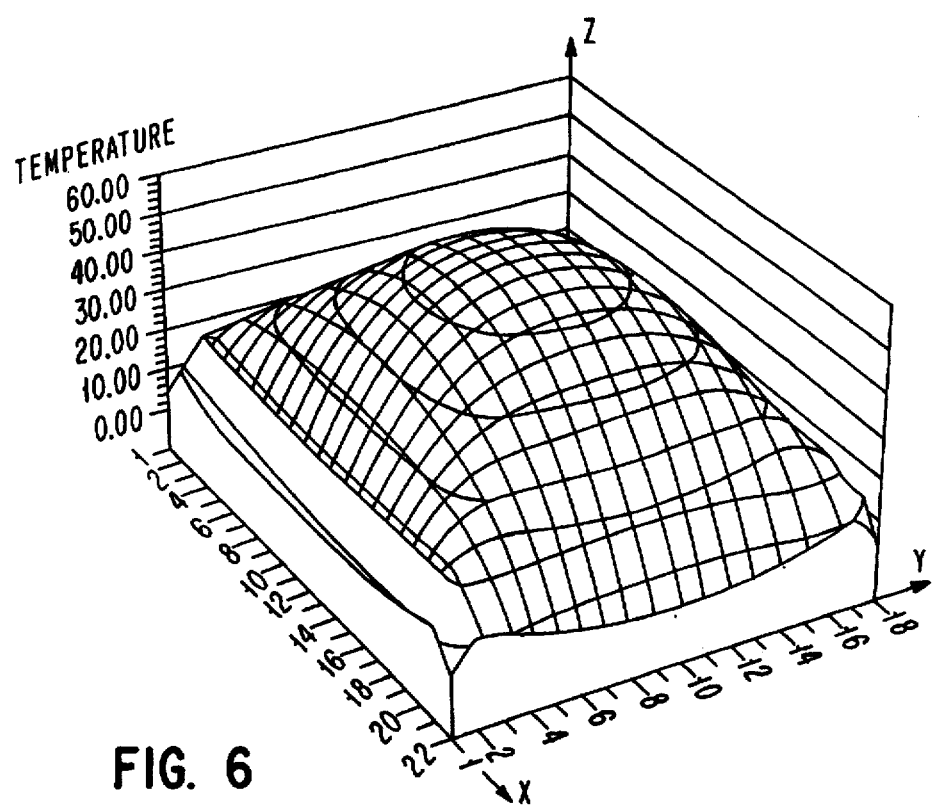
FIG. 6 is a three dimensional plot of the temperature (vertical axis) across the display surface of the liquid crystal display, of the present invention.

Now referring to FIG. 6, there is shown a three dimensional plot of the temperature (z axis) versus the display area in the x and y axes. It can be seen that the temperature difference between the center of the display area and the periphery of the display area is not as great as the temperature gradient of FIG. 3.

Figure 7:
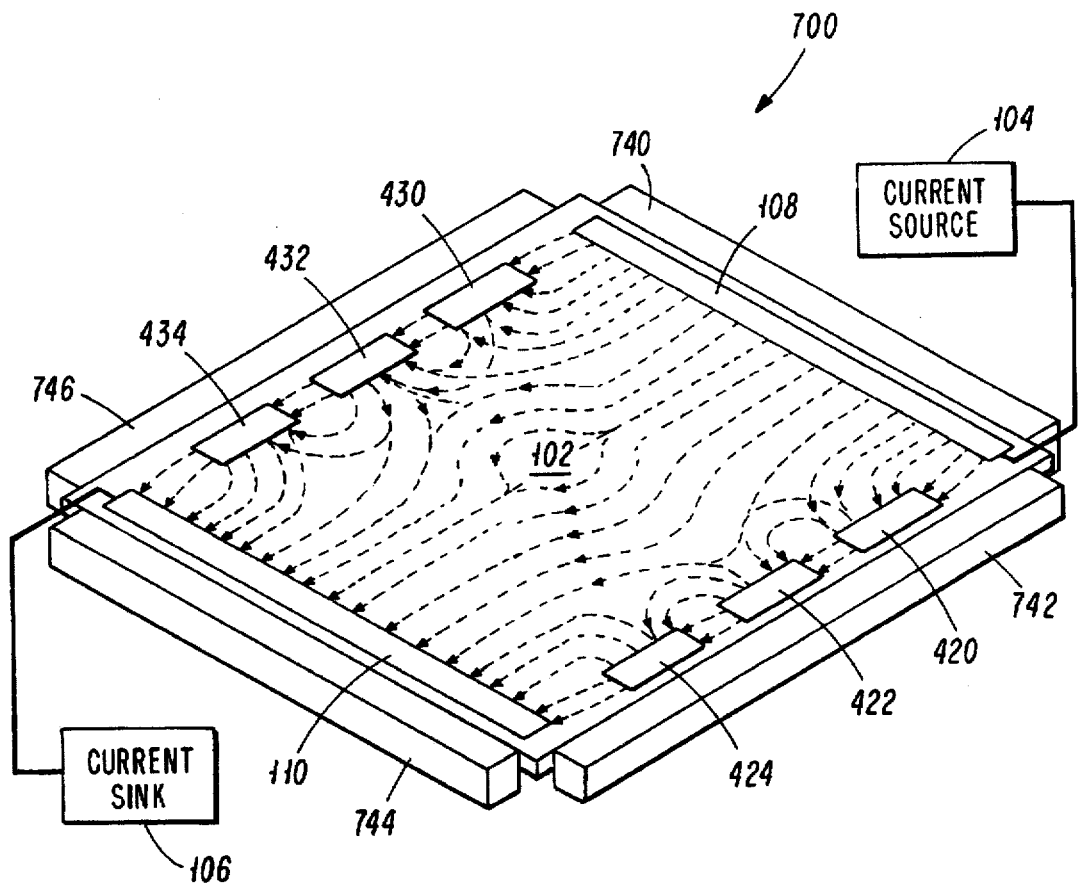
FIG. 7 is a perspective view of an LCD display, of the present invention, with a non-uniform heat generating film therein, disposed in a thermally conductive assembly, wherein the dotted lines represent current flow through the film.

Now referring to FIG. 7, there is shown a perspective view of a liquid crystal display, generally designated 700, of the present invention, having a resistive film 102 disposed thereon. Also shown are shorting bars 420, 422, 424, 430, 432, and 434 which are disposed between source electrode 108 and sink electrode 110. Also shown by dotted lines are current flow lines which clearly show that there is a higher current density around the periphery of the display. Also shown are clamps 740, 742, 744, and 746 which are devices which physically grasp the liquid crystal display lamination and consequently provide for heat conduction away from the display surface.

In operation, the placement, shape, size and impedance of shorting bars 420, 422, 424, 430, 432, and 434 are selected to closely match the heat conduction through the clamps 740, 742, 744, and 746. The shorting bars are shown disposed along the right and left edges only, however, they may be disposed anywhere around the display surface including across the top and bottom edges or in interior portions. When they are disposed in interior portions, it is desirable to utilize a transparent electrode with a lower impedance then the resistive film 102.

It is thought that the liquid crystal display with the non-uniform heating element, of the present invention, and many of its attendant advantages will be understood from the foregoing description and it will be apparent that various changes may be made in the form, the construction and arrangement of the parts thereof without departing from the spirit and scope of the invention or sacrificing all of their material advantages. The form herein being described is merely a preferred or exemplary embodiment thereof.

We claim:

1. A liquid crystal display heater comprising:

a continuous resistive film having a constant and uniform number of layers of resistive material and further having a top edge, a bottom edge, a left edge, and a right edge;

a current source electrode disposed along the top edge;

a current sink electrode disposed along the bottom edge;

a first shorting bar disposed along the right edge for providing a low impedance path between the top edge and the bottom edge; and, a second shorting bar on the left edge for providing a low impedance path between the top edge and the bottom edge, whereby, a non-uniform current flow is produced across the film so that the film produces more heat about the edges.

2. A liquid crystal display comprising:

a liquid crystal material;

a continuous resistive film having a constant and uniform number of layers of resistive material disposed upon the liquid crystal material;

a plurality of thermally conductive clamps coupled to the liquid crystal material;

a current source;

a current sink;

a plurality of shorting bars disposed on the liquid crystal material where the shorting bars have a lower impedance than the resistive film; and the shorting bars being arranged in a pattern so that the heat generated by the resistive film is matched to a predetermined heat conduction characteristics of the plurality of clamps.

3. A liquid crystal display comprising:

a display housing, having a predetermined thermal characteristic;

a liquid crystal display surface;

means for coupling said liquid crystal display surface to said display housing, said means for coupling having a predetermined thermal characteristic;

a continuous resistive film having a constant and uniform number of layers of resistive material disposed on said liquid crystal display surface, for generating heat on said liquid crystal display surface;

a current source, coupled to said film, for providing a current through the film;

a current sink, coupled to said film, for providing a current path through said films; and, a plurality of shorting bars, coupled to said film, for providing a lower impedance path from said current source to said current sink, in comparison to a predetermined impedance through said film said current source to said current sink.

4. A display of claim 3, wherein said plurality of shorting bars have a predetermined impedance characteristic which provides a current flow through the film in a pattern which is a function of the predetermined thermal characteristic of the means for coupling.

5. A display of claim 3 wherein the plurality of shorting bars comprises:

a plurality of shorting bars disposed between said current source and said current sink.

* * * * *